United States Patent
Einsele et al.

(10) Patent No.: US 11,349,411 B2
(45) Date of Patent: May 31, 2022

(54) METHOD FOR CONTROLLING A PULSE-WIDTH-MODULATED POWER CONVERTER, CONTROL DEVICE FOR A PULSE-WIDTH-MODULATED POWER CONVERTER, POWER CONVERTER ASSEMBLY, AND ELECTRICAL DRIVE SYSTEM

(71) Applicant: Robert Bosch GmbH, Stuttgart (DE)

(72) Inventors: Florian Einsele, Stuttgart (DE); Helge Sprenger, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/639,728

(22) PCT Filed: Aug. 9, 2018

(86) PCT No.: PCT/EP2018/071581
§ 371 (c)(1),
(2) Date: Feb. 17, 2020

(87) PCT Pub. No.: WO2019/034507
PCT Pub. Date: Feb. 21, 2019

(65) Prior Publication Data
US 2020/0204086 A1 Jun. 25, 2020

(30) Foreign Application Priority Data
Aug. 15, 2017 (DE) ................ 10 2017 214 207.3

(51) Int. Cl.
*H02P 27/08* (2006.01)
*H02M 7/5387* (2007.01)
(Continued)

(52) U.S. Cl.
CPC ........ *H02M 7/53871* (2013.01); *H02M 1/14* (2013.01); *H02M 1/32* (2013.01); *H02P 27/08* (2013.01); *H02P 2209/13* (2013.01)

(58) Field of Classification Search
CPC .......................... H02P 27/08; H02P 2209/13; H02M 7/53871; H02M 1/14; H02M 1/32; H02M 7/5395
See application file for complete search history.

(56) References Cited

U.S. PATENT DOCUMENTS 6,014,497 A * 1/2000 Kerkman .......... H02M 7/53875
318/254.2
6,058,036 A * 5/2000 Endo .................. H02M 7/53875
363/98

(Continued)

FOREIGN PATENT DOCUMENTS

DE 102008050543 4/2010
DE 102011104441 12/2012

(Continued)

OTHER PUBLICATIONS

International Search Report for Application No. PCT/EP2018/071581 dated Nov. 20, 2018 (English Translation, 3 pages).

*Primary Examiner* — Rina I Duda
(74) *Attorney, Agent, or Firm* — Micheal Best & Friedrich LLP

(57) ABSTRACT

The invention relates to an adjustment of a PWM frequency in a power converter in accordance with the input voltage of the power converter. By means of the adjustment of the PWM frequency in the power converter in accordance with the input voltage, a ripple on the input side of the power converter can be varied. In particular, it is possible, in the case of high input voltages, to minimize the ripple by adjusting the PWM frequency and thus to reduce the sum of the input voltage and the ripple.

18 Claims, 3 Drawing Sheets

(51) Int. Cl.
*H02M 1/14* (2006.01)
*H02M 1/32* (2007.01)

(56) References Cited

U.S. PATENT DOCUMENTS

| | | | | |
|---|---|---|---|---|
| 6,861,812 | B2* | 3/2005 | Kambara | H05B 41/2886 |
| | | | | 315/291 |
| 8,085,027 | B2* | 12/2011 | Lin | H02M 3/33507 |
| | | | | 323/300 |
| 8,319,458 | B2* | 11/2012 | Hiti | B60L 15/2009 |
| | | | | 318/375 |
| 8,446,113 | B2* | 5/2013 | Welchko | B60L 7/003 |
| | | | | 318/376 |
| 8,536,851 | B2* | 9/2013 | Lin | H02M 3/33507 |
| | | | | 323/300 |
| 8,975,857 | B2* | 3/2015 | Kawamura | H02P 27/085 |
| | | | | 318/801 |
| 2004/0207360 | A1* | 10/2004 | Matsushiro | B60H 1/3222 |
| | | | | 318/811 |
| 2005/0180183 | A1 | 8/2005 | Price et al. | |
| 2008/0298785 | A1 | 12/2008 | Patel et al. | |
| 2011/0194216 | A1 | 8/2011 | Schaub et al. | |
| 2012/0146594 | A1 | 6/2012 | Kobayashi | |
| 2012/0153882 | A1* | 6/2012 | Hong | H02M 1/14 |
| | | | | 318/400.26 |
| 2012/0323430 | A1* | 12/2012 | Nakamura | B60L 11/1803 |
| | | | | 701/22 |
| 2013/0063061 | A1* | 3/2013 | Hanada | H02P 25/024 |
| | | | | 318/400.14 |
| 2014/0022826 | A1* | 1/2014 | He | H02M 3/3372 |
| | | | | 363/25 |
| 2016/0072382 | A1* | 3/2016 | Ranmuthu | H02M 1/08 |
| | | | | 363/60 |

FOREIGN PATENT DOCUMENTS

| | | |
|---|---|---|
| DE | 102013014480 | 3/2015 |
| EP | 2816713 A1 | 12/2014 |
| WO | 2005081384 | 9/2005 |

* cited by examiner

METHOD FOR CONTROLLING A PULSE-WIDTH-MODULATED POWER CONVERTER, CONTROL DEVICE FOR A PULSE-WIDTH-MODULATED POWER CONVERTER, POWER CONVERTER ASSEMBLY, AND ELECTRICAL DRIVE SYSTEM

BACKGROUND OF THE INVENTION

The present invention relates to a method for controlling a pulse-width-modulated power converter, a control device for a pulse-width-modulated power converter, a power converter assembly and an electrical drive system.

Publication DE 10 2008 050 543 A1 discloses an overvoltage protection circuit for an intermediate circuit of an inverter. The protection circuit is designed to protect the intermediate circuit against overvoltages, and has a series-connecting element connected upstream of the intermediate circuit which can be bridged to limit the voltage of the intermediate circuit. The series-connecting element is bridged by means of a mechanical switching means, which in a feed-in operating mode of the inverter opens when the intermediate circuit voltage is greater than a prescribed voltage limit.

Inverters for electric and hybrid vehicles have an overvoltage trip device for self-protection against excessively high intermediate circuit voltages. This overvoltage trip device can be implemented in particular as hardware. To ensure that the intermediate circuit voltage is limited as far as possible in the event of a fault, a lower tolerance limit of the trip threshold for the overvoltage shutdown is placed as close as possible to the permissible control range of the inverter.

The intermediate circuit voltage of the inverter in this case is composed of a constant component of the input voltage and a superimposed ripple. The ripple arises due to the clocking of the pulse-width modulation (or PWM for short) of the inverter power amplifiers. The ripple depends very strongly on the frequency of the pulse-width modulation, the phase currents in the inverter, the modulation depth and the power factor of an electrical machine connected to the inverter. For determining the threshold of the overvoltage tripping therefore, the tolerance in the inaccuracy of the intermediate circuit voltage sensing and the maximum voltage ripple in operation at the maximum operating voltage are added to the maximum operating voltage. This value defines the minimum permissible lower response limit for the overvoltage trip.

SUMMARY OF THE INVENTION

The present invention discloses a control device for a pulse-width-modulated power converter, a power converter assembly, an electrical drive system and a method for controlling a pulse-width-modulated power converter.

Accordingly, the following is provided:

A control device for a pulse-width-modulated power converter. The control device is designed to ascertain a value of an input voltage of the power converter and to adjust a frequency for the pulse-width modulation in the power converter if the value of the ascertained input voltage exceeds a predetermined threshold.

Also provided is:

A converter assembly, having a pulse-width-modulated power converter, and a control device according to the invention.

Also provided is:

An electric drive system with an electric machine, a pulse-width-modulated power converter and a control device according to the invention for the pulse-width-modulated power converter.

Finally, the following is provided:

A method for controlling a pulse-width-modulated power converter. The method comprises a step of ascertaining an electrical input voltage to the power converter. The method also comprises a step of adjusting a frequency for the pulse-width modulation in the power converter if the value of the ascertained input voltage exceeds a predetermined threshold.

The present invention is based on the recognition that the voltage ripple on the input voltage of a pulse-width-modulated power converter, in other words, the voltage in the intermediate circuit of the power converter, depends on the frequency of the pulse-width modulation in the power converter, among other things. Therefore, for example, for setting the response threshold for an overvoltage trip in the power converter, in addition to the maximum permissible operating voltage the maximum occurring voltage ripple must also be taken into account. This maximum voltage ripple must be added to the maximum operating voltage. This can result in a relatively high threshold for the response of an overvoltage trip device.

The present invention is therefore based on the idea of taking account of this fact and providing a control for a pulse-width-modulated power converter, which reduces the voltage ripple that occurs, in particular at high input voltages of the power converter. Since the power converter of a pulse-width-modulated power converter also depends on the frequency of the pulse-width modulation in the power converter, among other things, it is therefore provided to adjust the frequency of the pulse-width modulation at high input voltages to the power converter. In this way, at high input voltages the voltage ripple due to the pulse-width modulation can be reduced. By reducing the voltage ripple, especially at high input voltages, it is possible to reduce the voltage threshold for the response of an overvoltage trip device. At low input voltages, on the other hand, a relatively high voltage ripple is not particularly critical, so that at lower input voltages either no or only a relatively small adjustment of the frequency of the pulse-width modulation needs to be made.

The lowering of the response threshold for triggering an overvoltage shutdown reduces the maximum electrical voltages occurring in the power converter. This means that the risk of possible damage to components in the power converter can be reduced. In this way, the reliability and service life of the power converter can be improved.

In addition, due to the lower threshold for triggering an overvoltage shutdown and the associated lowering of the maximum electrical voltage in the power converter, the components in the electrical power converter can also be dimensioned accordingly. This allows smaller, lighter and also less expensive components to be used. In this way, the required assembly space for the power converter can be reduced and the production costs for the power converter can be decreased.

The input voltage which is used for the adjustment of the frequency of the pulse-width modulation in the power converter is, in particular, the electrical voltage that is applied via an intermediate circuit of the power converter during operation. This input voltage very closely corresponds to an electrical voltage supplied by a voltage source, such as a traction battery of an electric or hybrid vehicle.

The frequency of the pulse-width modulation in the power converter is in this case understood to be the frequency of a power converter or inverter, generally referred to as the "PWM frequency". Due to the generally common usage of the abbreviation PWM even for the German equivalent term, this abbreviation will also be used hereafter. In particular, this PWM frequency is the frequency with which the individual switching elements in the power converter are switched on and off. As a rule, this PWM frequency has a fixed value in conventional converters.

The predetermined threshold value of the input voltage, above which the frequency for the pulse-width modulation of the power converter is adjusted, can be set, for example, to a fixed, constant voltage value. For example, as a predetermined threshold value a voltage value can be selected that corresponds to a specified fraction of the maximum permissible voltage in the power converter. Thus, for example, 50%, 70%, 80%, 90%, 92% or 95% of the maximum permissible voltage or maximum input voltage in the converter can be selected as a predetermined threshold.

According to one embodiment the control device is designed to set the frequency of the pulse-width modulation in the power converter to a specified value if the value of the ascertained input voltage exceeds the predetermined threshold. In this way, the frequency of the pulse-width modulation can be adjusted particularly simply when the input voltage rises.

According to one embodiment the control device is designed to adjust the frequency of the pulse-width modulation in the power converter according to a predetermined function, if the value of the ascertained input voltage exceeds the predetermined threshold. By adjusting the frequency of the pulse-width modulation on the basis of a predetermined function, the frequency of the pulse-width modulation can be adapted dynamically over a control range. In this way, an optimal working point for the frequency of the pulse-width modulation can be selected in each case. For the function, for example, an at least partially linear function, a stepwise function, a quadratic function or any other function can be selected.

According to one embodiment the function for adjusting the frequency of the pulse-width modulation specifies the frequency as a function of the input voltage of the power converter, the frequency of the output voltage of the power converter, and/or a setpoint for a load connected to the power converter. Such a setpoint of a load can be, for example, a specified torque value of an electric machine, an electric current, such as a phase current, or any other parameter. In this way, when adjusting the frequency of the pulse-width modulation in the power converter a particularly suitable operating point can be set.

According to one embodiment the control device is designed to superimpose noise or any other function on the frequency of the pulse-width modulation in the power converter. In particular, for example, a narrow-band noise can be superimposed on the frequency of the pulse-width modulation. This can improve the electromagnetic compatibility, and potential interference effects on other electronic devices in the vicinity of the power converter can be minimized.

According to one embodiment the control device is designed to detect the value of the input voltage of the power converter by means of a voltage sensor. Additionally or alternatively, the control device can also be designed to receive the value of the input voltage of the power converter by means of a communication interface. For example, via a suitable connection the control device can receive a value of a connected voltage source, such as a traction battery of an electric or hybrid vehicle, and take this received voltage value into account. The received voltage value can be used, for example, directly as an input voltage, or a value for the input voltage can be derived, in fact calculated, from the received voltage value. In addition, any other possibilities are also conceivable for detecting the input voltage, of course.

In accordance with one embodiment of the method for controlling the pulse-width-modulated power converter, the step of adjusting the frequency of the pulse-width modulation can increase the frequency of the pulse-width modulation if the value of the ascertained input voltage exceeds a predetermined threshold. Increasing the frequency of the pulse-width modulation normally reduces the voltage ripple. Thus, it is possible to ensure that, especially at high input voltages, due to the lower voltage ripple any overvoltage protection device does not respond too soon—or in other words, the possible triggering threshold for an overvoltage protection device can be reduced, because on account of the lower voltage ripple caused by the higher frequency of the pulse-width modulation, the maximum overall voltage will also be reduced.

In accordance with one embodiment of the method for controlling the pulse-width-modulated power converter, the step of adjusting the frequency of the pulse-width modulation adjusts the frequency of the pulse-width modulation only if the current frequency of the pulse-width modulation falls below a specified limit. This can ensure, in particular in the case of a dynamic adaptation of the frequencies for the pulse-width modulation, that a modification of the frequency of the pulse-width modulation is only carried out for low frequencies of the pulse-width modulation. If due to a dynamic adjustment of the pulse-width modulation frequency a high frequency has already been selected for the pulse-width modulation, then any further modification and, in particular, increase in the frequency of the pulse-width modulation can be omitted.

Where practical, the above embodiments and extensions can be combined with each other in any way desired. Further embodiments, extensions and implementations of the invention also comprise combinations of features of the invention either described previously or in the following in relation to the exemplary embodiments, which are not explicitly mentioned. In particular, the person skilled in the art will also be able to add individual aspects as improvements or additions to each of the basic forms of the present invention.

BRIEF DESCRIPTION OF THE DRAWINGS

The present invention is described in more detail hereafter with the aid of the exemplary embodiments given in the schematic figures of the drawings. These show.

DETAILED DESCRIPTION

Figure 1:
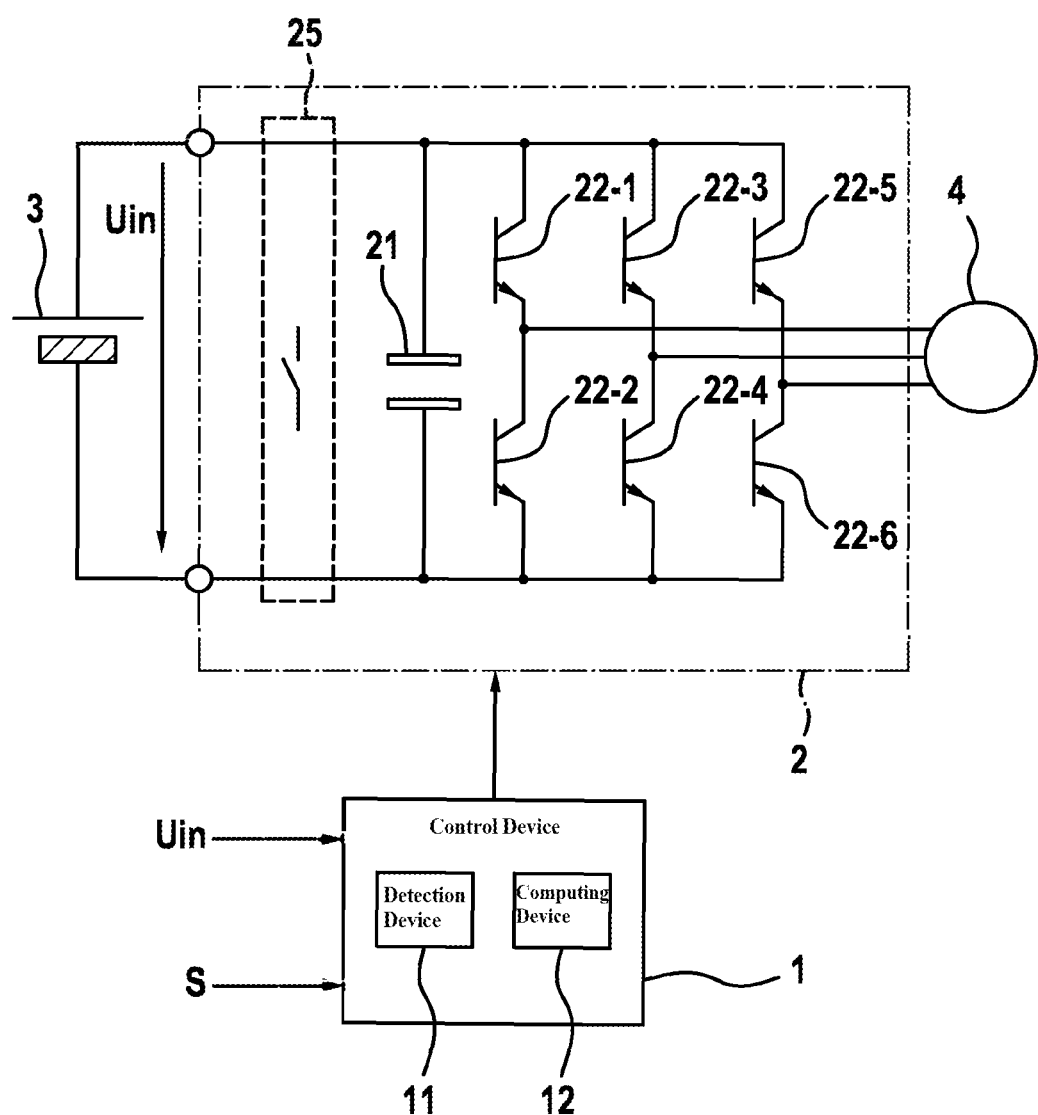
FIG. 1: a schematic representation of drive system with a control device for a power converter according to one embodiment.

FIG. 1 shows a schematic representation of an electrical drive system according to one embodiment. The electric drive system comprises a voltage source 3. For example, the voltage source 3 can be a battery, such as a traction battery of an electric or hybrid vehicle. In principle, however, any other voltage sources, in particular any DC voltage sources, are also possible. The voltage supply 3 is connected to an input terminal of a power converter 2. On the output side the power converter 2 is connected to an electrical load 4. For example, this electrical load 4 can be an electrical machine, such as an electric motor or similar device. The form of a three-phase electrical load shown here serves purely as an example and does not constitute a limitation of the present invention. Likewise, single-phase electrical loads or even loads with more than three electrical phases can also be provided.

At the input side of the power converter 2 an intermediate circuit capacitor 21 can be provided, for example. The power converter 2 also comprises a plurality of electrical switching elements **22-*i*. For example, for each phase of the output terminal of the power converter 2 a half-bridge consisting of two electrical switching elements 22-*i*** can be provided. In this way, in the example shown here, by using three half-bridges a B6 bridge can be implemented.

The individual switching elements **22-*i* of the power converter 2 can be controlled, for example, by a control device 1. In principle any type of control can be implemented, in particular any pulse-width modulated control of the individual switching elements 22-*i*, by means of the control device 1**.

In the case of a pulse-width-modulated control of the individual switching elements **22-*i*, in accordance with the duty cycles of the individual control signals for the individual switching elements 22-*i* the respective output voltage or the output current in each of the phases at the output of the converter 2** can be set. Since the basic principle of the pulse-width-modulated control of a power converter is known, this is not explained further in the following.

The pulse-width-modulated control of the individual switching elements **22-*i* is carried out at a specified frequency (PWM frequency). In principle, the PWM frequency for the control of the switching elements 22-*i*** can be set to a fixed, predefined frequency value. In particular, for example, a frequency in the range of 9 kHz, 10 kHz or else any other fixed frequency can be selected. If necessary, the specified PWM frequency can be additionally superimposed with a narrowband signal, for example a narrowband noise. In this way, the electromagnetic compatibility of the system can be increased.

The control device 1 can therefore perform the control of the individual switching elements **22-*i* based on setpoint specifications S. The setpoint values S can be, for example, specifications such as a torque of a connected electrical machine, a rotation speed of a connected electrical machine, phase currents or voltages at the output terminals of the power converter 2**, a power factor, a modulation depth or any other setpoint value.

Furthermore, the control device 1 can determine the input voltage Uin at the input terminal of the power converter 2. For example, the value of the input voltage can be determined in a detection device 11. For example, to this end a voltage sensor (not shown) can be provided at the input terminal of the power converter 2. Such a voltage sensor can provide an output signal, for example in analog or digital form, which corresponds to the input voltage at the power converter 2, in particular to the voltage across the intermediate circuit capacitor 21. In addition, or alternatively, the control device 1 can also receive an analog or digital signal from another device, which provides a signal corresponding to the input voltage Uin. Thus, for example, the voltage of a connected battery 3 can be detected and this can then be provided as the input voltage Uin of the control device 1. Such a detection of the battery voltage can be captured and supplied, for example, by means of a battery management system (BMS).

The control device 1 can then adjust the frequency of the pulse-width modulation in the power converter 2 using the size of the input voltage Uin. This may be carried out, for example, in a computing device 12. For example, the power converter 2 can be operated with a first frequency for the pulse-width modulation (PWM frequency) as long as the input voltage Uin to the power converter 2 is below a specified threshold. If the input voltage Uin exceeds the specified threshold, then the control device 1 can drive the power converter 2 with a second frequency, different from the first PWM frequency. In particular, the second PWM frequency can be higher than the first PWM frequency. The specified threshold value for the changeover between the two PWM frequencies can be permanently specified in the control device 1. In addition, a dynamic adjustment of the threshold for switching between the PWM frequencies is also possible.

In addition to the previously described abrupt switching between two PWM frequencies a dynamic adjustment of the PWM frequency is also possible. Thus, for example, the PWM frequency to be set can be specified as an arbitrary function of the input voltage Uin and, if appropriate, of one or more additional parameters. For example, with increasing input voltage Uin the PWM frequency can also be varied, in particular raised, in a stepwise, linear, quadratic manner or with any other function. For example, it is also possible firstly to keep the PWM frequency constant up to a predefined threshold and above this threshold to adjust the PWM frequency linearly or based on a further function of the input voltage and, if appropriate, other parameters.

Other possible parameters for adjusting the PWM frequency, for example, are as a function of a torque to be set on a connected electric machine 4, a function of the output frequency of the power converter 2, a function of the output voltage of the power converter 2, or any other desired parameter. In particular, the dependence of the PWM frequency on the input voltage and, if applicable, the additional parameters, can be specified in the control device 1 in the form of a mathematical function or even in the form of a table.

The increase of the PWM frequency will usually cause the ripple on the input side of the power converter 2 to decrease. If, as previously described, the PWM frequency is increased with increasing input voltage Uin, thereby reducing the ripple on the input side, the increase consisting of the sum of the input voltage and ripple can be reduced in comparison to a system with constant PWM frequency.

To provide protection for the power converter 2, an overvoltage protection device, for example, can be provided in the power converter 2. This overvoltage protection device 25 can disconnect the power converter 2 from a voltage source 3 when a specified voltage value is exceeded on the input side of the power converter 2. This allows possible damage to the power converter 2 to be avoided. By means of the previously described adjustment of the PWM frequency as a function of the input voltage Uin it is possible, as already mentioned, to reduce the sum of input voltage and ripple in comparison to a non-adapted system. In this way, therefore, particularly with very high ripple an excessively rapid response of the overvoltage protection device 25 can be avoided. In this way, on the one hand, malfunctions due to too early a response of the overvoltage protection device 25 can be prevented. In addition, the response threshold of the overvoltage protection device 25 can be set to a lower value, so that an increased protection of the power converter 2 is guaranteed.

Figure 2:
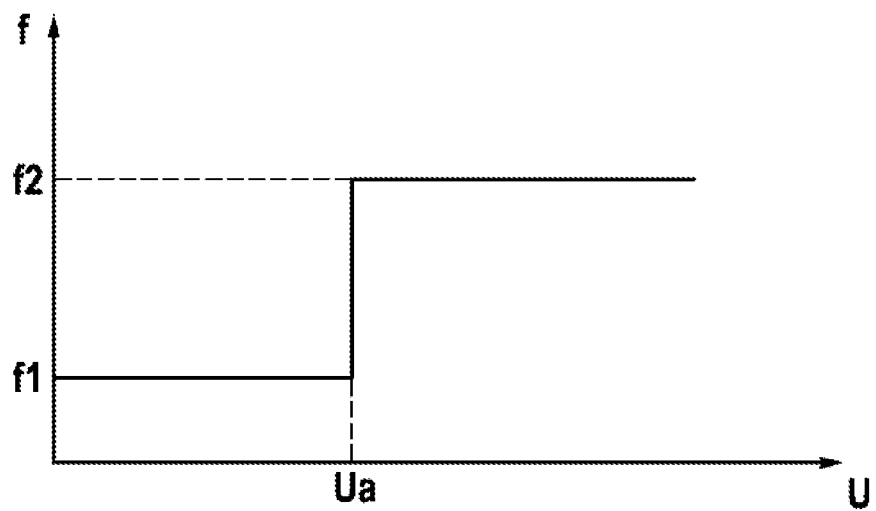
FIG. 2: a schematic representation of a voltage-frequency diagram, such as forms the basis of a PWM-frequency adaptation in accordance with one embodiment.

FIG. 2 shows a schematic representation of a characteristic of the PWM frequency against the input voltage Uin in accordance with an exemplary embodiment. As can be identified here, below a predefined threshold voltage Ua the power converter 2 is operated at a first PWM frequency f1. Once the input voltage Uin at the converter 2 exceeds the threshold value Ua, the power converter 2 is operated at a second PWM frequency f2.

Figure 3:
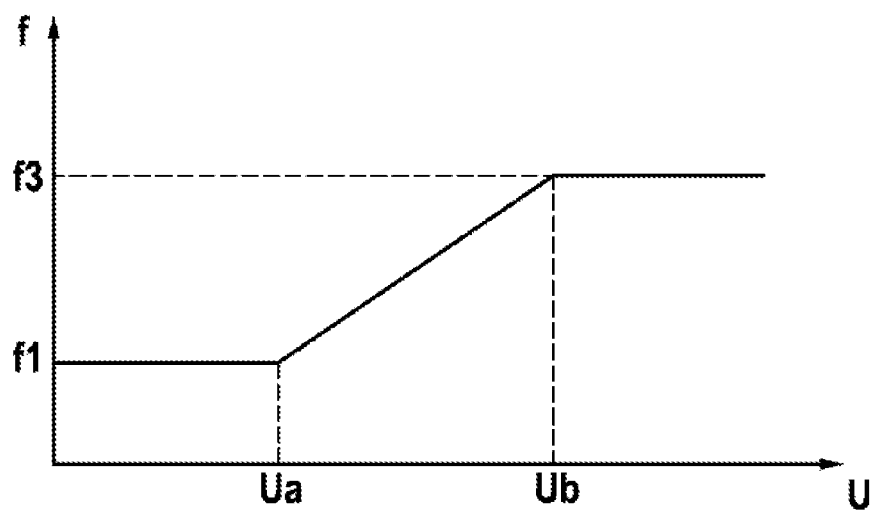
FIG. 3: a schematic representation of a voltage-frequency diagram, such as forms the basis of a PWM-frequency adaptation in accordance with another embodiment.

FIG. 3 shows a schematic illustration of a voltage-frequency characteristic according to a further exemplary embodiment. In this exemplary embodiment also, below a predefined threshold voltage Ua the power converter 2 is operated at a first PWM frequency f1. Once the input voltage Uin exceeds the first threshold Ua, the PWM frequency can be increased according to a prescribed function, for example, as a linear function of the input voltage Uin. Above a second threshold voltage Ub the PWM frequency can if necessary be limited to a maximum value f3.

Figure 4:
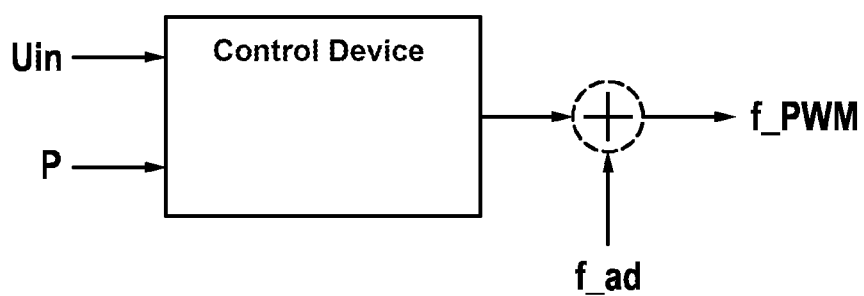
FIG. 4: a schematic representation for the adjustment of the PWM frequency in accordance with one embodiment.

FIG. 4 shows a schematic representation of a block circuit diagram for determining the PWM frequency f_PWM as a function of the input voltage Uin and possibly of one or more additional parameters P. For example, the input voltage Uin and, if applicable, other optional parameters P can be fed to the control device 1. The control device 1 can then determine, based on a mathematical function or using a table—(look-up table LUT), a predefined PWM frequency f_PWM from the input parameters Uin and P and use this for controlling the switching elements 22-*i* in the power converter 2.

If applicable, the respectively determined PWM frequency value can then be overlaid with a further signal f_ad, in particular a further high-frequency, narrowband signal such as a narrowband noise. In this way, even with a variable PWM frequency the electromagnetic compatibility of the overall system can be increased.

In the previously described exemplary embodiments a constant PWM frequency is initially assumed for the control of the power converter 2, which according to the invention can be adjusted, in particular raised, using the input voltage Uin. Furthermore, the principle according to the invention can also be applied to pulse-width-modulated power converters that already apply a variable PWM frequency as standard. Such power converters can adjust the PWM frequency, for example, as a function of setpoint values to be set on the output side. An adjustment of the PWM frequency as a function of the current power to be output from the power converter 2 is also possible. Also in this case, the initially specified, variable PWM frequency can additionally be adjusted, in particular raised, as a function of the input voltage Uin of the power converter 2.

In this case, for example, an adjustment, in particular an increase of the PWM frequency, may also only be carried out up to a maximum specified upper PWM frequency. If the power converter 2 is already being operated with a maximum PWM frequency due to other external parameters, then in this case any further increase in the PWM frequency as a function of the input voltage Uin may be omitted. In addition, any further modifications for adjusting the PWM frequency as a function of the input voltage Uin are also possible.

Figure 5:
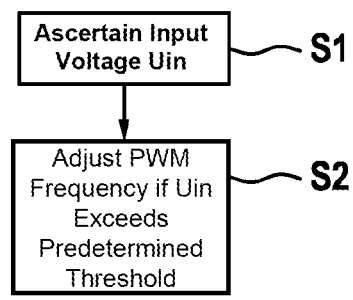
FIG. 5: a schematic representation of a sequence diagram, such as forms the basis of a method for controlling a pulse-width-modulated power converter according to one embodiment.

FIG. 5 shows a schematic representation of a flow diagram, such as forms the basis of a method for controlling a pulse-width-modulated power converter according to one embodiment. In a first step S1, the electrical input voltage Uin of the power converter 2 is ascertained. The input voltage Uin of the power converter 2 can be ascertained in any desired manner, in particular in a manner previously described, by voltage measurement or data transfer from a battery management system or similar.

In step S2 the frequency for the pulse-width modulation (PWM frequency) in the power converter 2 is adjusted if the value of the ascertained input voltage Uin exceeds a predetermined threshold. In particular, any previously described adjustment is possible, in particular any previously described adjustment of the PWM frequency as a function of the input voltage Uin and, if applicable, also as a function of other parameters.

The step S2 of adjusting the PWM frequency can be limited, in particular, to a specified maximum limit value. In particular if other parameters are already being used for adjusting the PWM frequency for the power converter 2, then an adjustment, in particular an increase, of the PWM frequency as a function of the input voltage Uin may be limited to only a maximum specified upper PWM frequency.

In conclusion, the present invention relates to the adjustment of a PWM frequency in a power converter as a function of the input voltage of the power converter. By adjusting the PWM frequency in the power converter as a function of the input voltage, a ripple on the input side of the power converter can be varied. In particular, with this method it is possible to minimize the ripple at high input voltages by adjusting the PWM frequency and thus to reduce the sum of the input voltage and ripple combined.

The invention claimed is:

1. A control device (1) for a pulse-width-modulated power converter (2), the control device (1) comprising:
 a detection device (11) to ascertain a value of an input voltage (Uin) of the power converter (2), and
 a computing device (12) to increase a frequency for the pulse-width modulation in the power converter (2) when the value of the ascertained input voltage (Uin) exceeds a predetermined threshold (Ua), and to set the frequency of the pulse-width modulation in the power converter (2) to a specified constant frequency (f3) when the value of the ascertained input voltage (Uin) exceeds a second predetermined threshold (Ub),
 wherein the second predetermined threshold (Ub) is greater than the predetermined threshold (Ua).

2. The control device (1) as claimed in claim 1, wherein the control device (1) is additionally configured to overlay the frequency of the pulse-width modulation in the power converter (2) with an additional high-frequency signal.

3. The control device (1) as claimed in claim 1, wherein the control device (1) is configured to detect the value of the input voltage (Uin) of the power converter (2) by means of a voltage sensor and/or to receive the value of the input voltage (Uin) of the power converter (2) by means of a communication interface.

4. A power converter assembly comprising:
the pulse-width-modulated power converter (2) including an intermediate circuit capacitor (21) and a plurality of electrical switch elements (22-i) forming half-bridges, and
the control device (1) as claimed in claim 1.

5. An electrical drive system comprising:
a battery (3); and
an electrical machine (4);
the pulse-width-modulated power converter (2), which is configured to control the electric machine (4), and
the control device (1) as claimed in claim 1.

6. The control device (1) as claimed in claim 1, including a three or more phase electrical load.

7. The electrical drive system of claim 5, wherein the electrical drive system is a vehicle electrical drive system for an electric or hybrid vehicle.

8. The electrical drive system of claim 7, wherein the battery (3) is a traction battery.

9. The electrical drive system of claim 5, wherein the battery (3) is a traction battery.

10. The control device of claim 1, wherein the computing device (12) is configured to set the frequency of the pulse-width modulation in the power converter (2) to a specified constant value (f1) when the value of the ascertained input voltage (Uin) is less than the predetermined threshold (Ua).

11. A control device (1) for a pulse-width-modulated power converter (2), the control device (1) comprising:
a detection device (11) to ascertain a value of an input voltage (Uin) of the power converter (2), and
a computing device (12) configured to set the frequency of the pulse-width modulation in the power converter (2) to a specified constant value (f2) when the value of the ascertained input voltage (Uin) exceeds a predetermined threshold, and configured to set the frequency of the pulse-width modulation in the power converter (2) to a specified constant value (f1) when the value of the ascertained input voltage (Uin) is less than the predetermined threshold.

12. The control device (1) as claimed in claim 1, wherein the frequency of the pulse-width modulation in the power converter (2) remains at the specified constant frequency (f3) when the value of the ascertained input voltage (Uin) continues to increase beyond the exceeded second predetermined threshold (Ub).

13. The control device (1) as claimed in claim 11, wherein the frequency of the pulse-width modulation in the power converter (2) remains at the specified constant frequency (f2) when the value of the ascertained input voltage (Uin) continues to increase beyond the exceeded predetermined threshold.

14. The control device (1) as claimed in claim 11, including a three or more phase electrical load.

15. A method for controlling a pulse-width-modulated power converter (2), the method comprising:
ascertaining (S1) an electrical input voltage (Uin) to the power converter (2); and
increasing (S2) a frequency for the pulse-width modulation in the power converter (2) when the value of the ascertained input voltage (Uin) exceeds a predetermined threshold (Ua); and
setting the frequency of the pulse-width modulation in the power converter (2) to a specified constant frequency (f3) when the value of the ascertained input voltage (Uin) exceeds a second predetermined threshold (Ub),
wherein the second predetermined threshold (Ub) is greater than the predetermined threshold (Ua).

16. The method as claimed in claim 15, including setting the frequency of the pulse-width modulation in the power converter (2) to a specified constant frequency (f1) when the value of the ascertained input voltage (Uin) is less than the predetermined threshold (Ua).

17. The method as claimed in claim 15, the ascertaining (S1) of the electrical input voltage (Uin) including a control device (1) having a detection device (11).

18. The method according to claim 15, wherein the frequency of the pulse-width modulation in the power converter (2) remains at the specified constant frequency (f3) when the value of the ascertained input voltage (Uin) continues to increase beyond the exceeded second predetermined threshold (Ub).

* * * * *